UNITED STATES PATENT OFFICE.

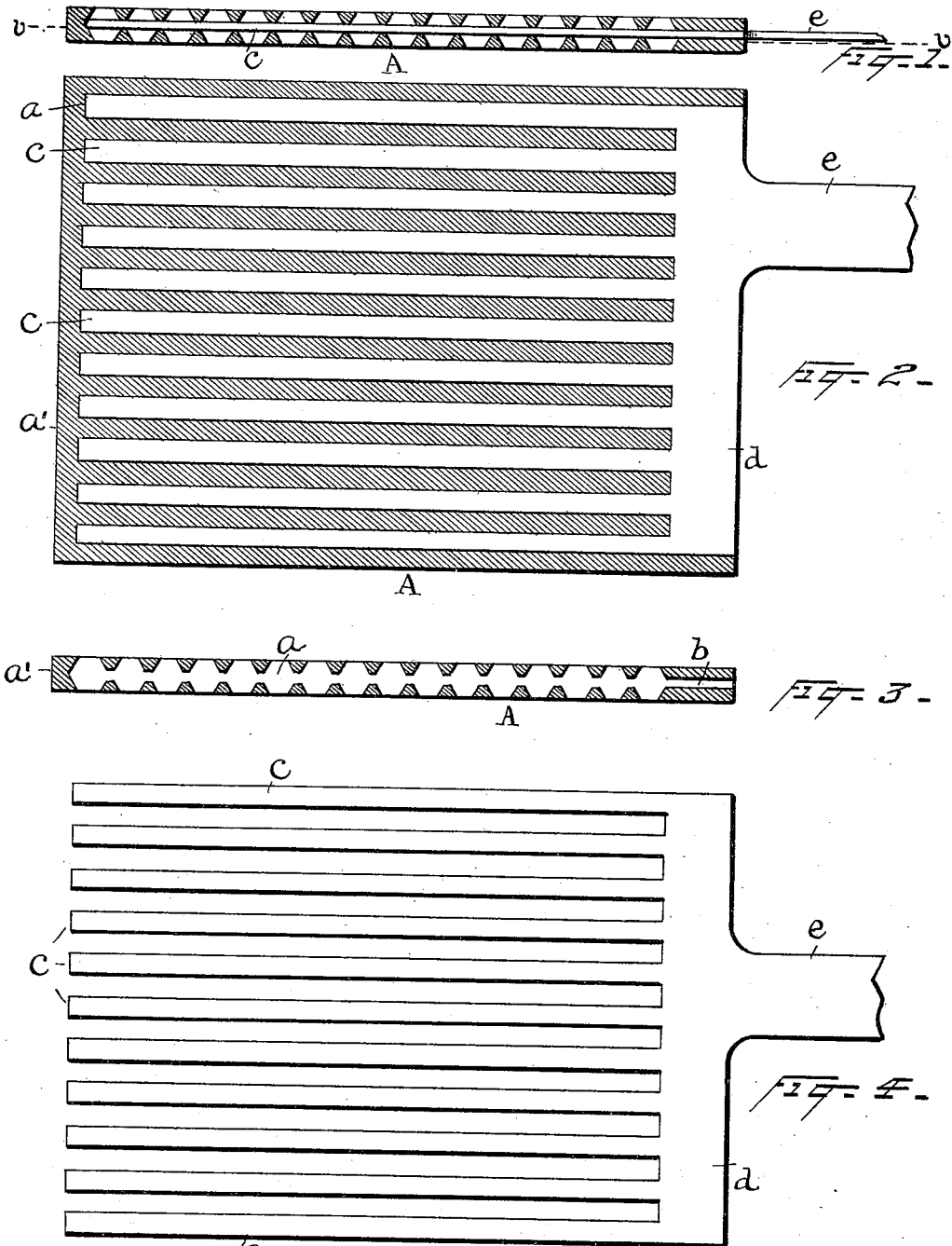

PATRICK KENNEDY, OF NEW YORK, N. Y.

STORAGE BATTERY.

SPECIFICATION forming part of Letters Patent No. 645,750, dated March 20, 1900.

Application filed March 16, 1899. Renewed March 1, 1900. Serial No. 6,920. (No model.)

*To all whom it may concern:*

Be it known that I, PATRICK KENNEDY, of New York, (Brooklyn,) in the county of Kings and State of New York, have invented certain new and useful Improvements in Storage Batteries; and I do hereby declare that the following is a full, clear, and exact description of the same, reference being had to the accompanying drawings, making a part of this specification, in which—

Figure 1 is a transverse sectional view illustrating a storage battery made according to my invention. Fig. 2 is a sectional view taken in the line $v\ v$ of Fig. 1. Fig. 3 is a transverse sectional view representing one portion of a storage battery made according to my invention. Fig. 4 is a face view of an independently-formed grid which enters into a certain combination of parts included in my invention.

This invention relates to that class of storage batteries in which the active material is held in place by non-conducting cellular plates used in combination with metallic conductors intended to be in contact with said active material. In practice such construction of storage batteries has developed certain defects which my present invention is designed to remedy.

To this end my said invention comprises certain new and useful structures and combinations of parts, hereinafter set forth and explained.

A is the structure which carries the active material of the battery and which for convenience I designate as a "cellular plate." This plate is made of india-rubber or any other suitable non-conductor of electricity possessed of a sufficient degree of elasticity or yielding character to enable it to conform to the swelling or change of form of the active material carried by it during the exigencies of operation and use. This plate A is of any appropriate thickness and in a plane parallel, or substantially so, with its two outer surfaces and midway, or nearly so, between said surfaces has a series of internal channels $a$. These may be closed at their inner ends $a'$. At their outer ends, as shown in the drawings, they merge into a deep groove $b$, formed at right angles to them in the end portion of the plate, as shown more clearly in Fig. 3 and indicated as between the dotted lines $x\ x$ in Fig. 2. In each side of the plate and coincident with the channels $a$ in such a manner that their inner ends communicate with said channels are the cells C, which are intended to receive the active material of the battery. These cells should be larger at their inner than their outer ends in order that the active material when in place in the cells may not be readily dislodged in an outward direction.

It will be observed that the cellular plate A made as described is intended to be integral throughout and to be formed ready for use before the application thereto or connection therewith of any metallic grid or conductor. By this means the difficulty heretofore experienced in uniting two opposite portions of a cellular non-conducting plate through the slots or interstices of a metallic conducting-grid are entirely avoided, and I secure a degree of permanence in the plate itself and in its utility in holding the active material in place in the cells which heretofore has been found to be impossible in practice.

Cellular non-conducting storage-battery plates made as described may be readily manufactured and conveniently kept in stock awaiting occasion for the filling of their cells with active material and the insertion of suitable metallic or conducting grids to complete the battery for use.

In Fig. 4, C' is the grid, which is intended for use in connection with the cellular plate above described. It comprises the flat bars $c$, of a size and shape to be readily inserted lengthwise in the channels $a$ of the plate A in such a position as to close the inner ends of the cells C. These bars are connected at their outer ends by a transverse head $d$, which is so proportioned as to fit snugly in the groove $b$ of the plate A when the bars $c$ are inserted in the channels $a$ of the latter. The transverse head $d$ is provided with a shank or projection $e$, by means of which the usual wires and connections may be connected with the grid when the latter has been placed in position in the channels $a$ and the groove $b$ of the plate. It will be observed that when the transverse head $d$ is placed in the groove $b$ it is covered on both sides, and instead of being exposed to liquid, as has heretofore been usual during the charging of the battery, is protected therefrom, so that the waste of current or electrical energy incident to the contact of the head with the liquid and heretofore a common incident to the charging of batteries of the class to which my invention relates is entirely, or nearly so, prevented.

The grid may be of lead or any other suitable conducting material, and the size and thickness of the plate itself and the proportions of the channels $a$ and of the groove $b$ therein may vary within wide limits without departing from my invention. Ordinarily there should be one channel to each pair of rows or series of cells in the plate, the inner ends of the cells of each row or series being, when the plate is applied to use, closed by a bar $c$ of the inserted grid in such a way that the active material in the cells of the rows may be in the requisite contact and relation with the bar.

What I claim as my invention is—

1. A cellular plate for carrying the active material of a storage battery composed of a non-conducting and elastic or yielding material and having cells in the opposite sides and channels communicating with the inner ends of said cells and constructed and arranged for the insertion lengthwise of the bars of a conducting-grid, substantially as herein set forth.

2. A cellular plate for carrying the active material of a storage battery composed of non-conducting and elastic or yielding material and having cells in its opposite sides, channels communicating with the inner ends of the cells of the plate, and a transverse groove in the end of the plate and communicating with the adjacent ends of said channels, the channels and grooves being provided and arranged for the insertion of the bars and transverse head of an independently-formed conducting-grid, substantially as herein set forth.

3. The combination with a conducting-grid having parallel bars and a transverse head connecting said bars, with a cellular non-conducting plate having cells at its opposite sides, internal channels which communicate with said cells at their inner ends, and a groove which connects said channels at their outer ends, substantially as set forth.

PATRICK KENNEDY.

Witnesses:
 MORRIS H. HAYMAN,
 ARTHUR RONSSEL.